No. 893,416. PATENTED JULY 14, 1908.
C. G. ABBOT.
VARIABLE SPEED POWER TRANSMISSION MECHANISM.
APPLICATION FILED APR. 30, 1906.

2 SHEETS—SHEET 1.

Witnesses

Inventor
Charles Greeley Abbot

No. 893,416. PATENTED JULY 14, 1908.
C. G. ABBOT.
VARIABLE SPEED POWER TRANSMISSION MECHANISM.
APPLICATION FILED APR. 30, 1906.
2 SHEETS—SHEET 2.
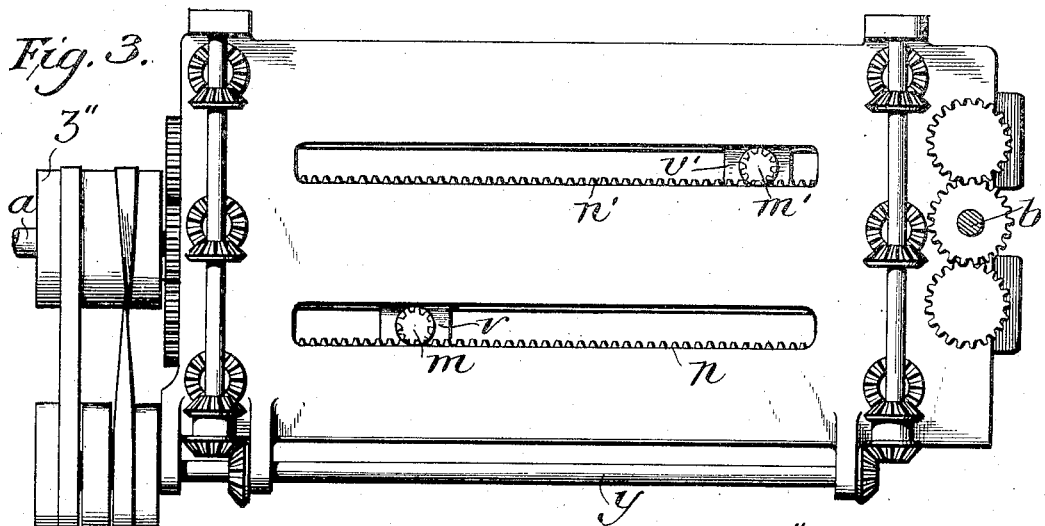
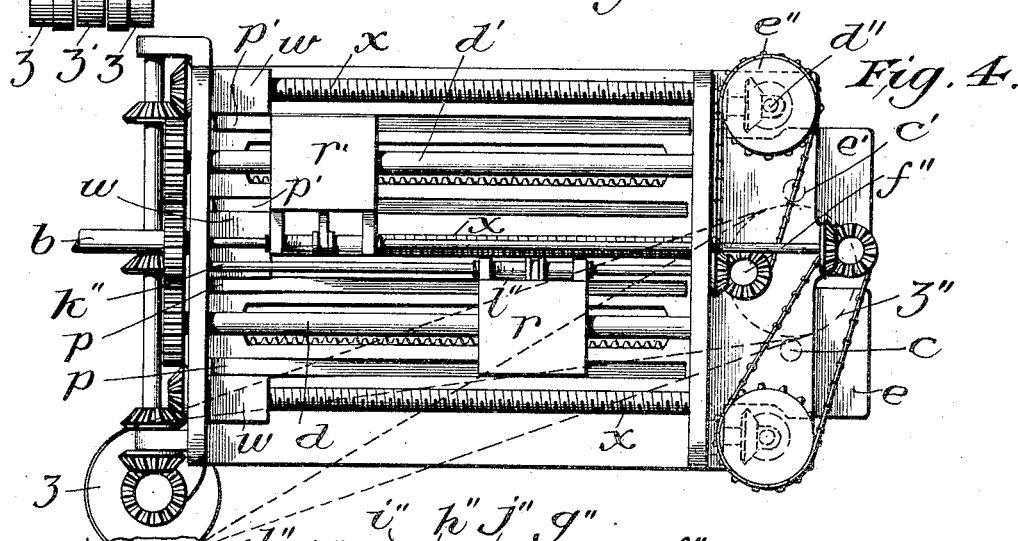
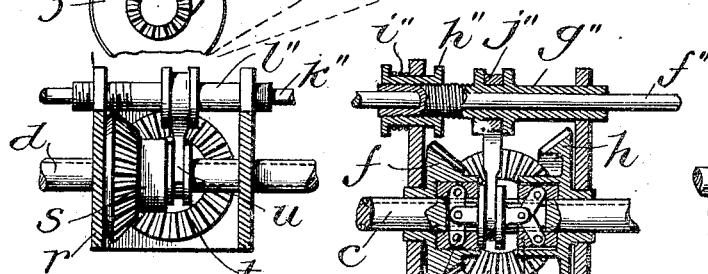
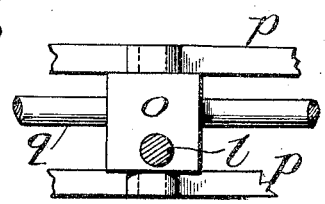
Witnesses
Inventor
Charles Greeley Abbot

UNITED STATES PATENT OFFICE.

CHARLES GREELEY ABBOT, OF WASHINGTON, DISTRICT OF COLUMBIA.

VARIABLE-SPEED POWER-TRANSMISSION MECHANISM.

No. 893,416.  Specification of Letters Patent.  Patented July 14, 1908.

Application filed April 30, 1906. Serial No. 314,454.

*To all whom it may concern:*

Be it known that I, CHARLES GREELEY ABBOT, a citizen of the United States, residing at Washington, in the District of Columbia, have invented certain new and useful Improvements in Variable-Speed Power-Transmission Mechanism, of which the following is a specification.

My invention relates to mechanisms for transmitting power from a driving element to a driven element in such a manner that the ratio of the speed of the driven element to that of the driving element may be established and maintained constantly and definitely at any desired quantity, or continuously varied without stopping or designedly altering the speed of the driving element.

Figure 1:
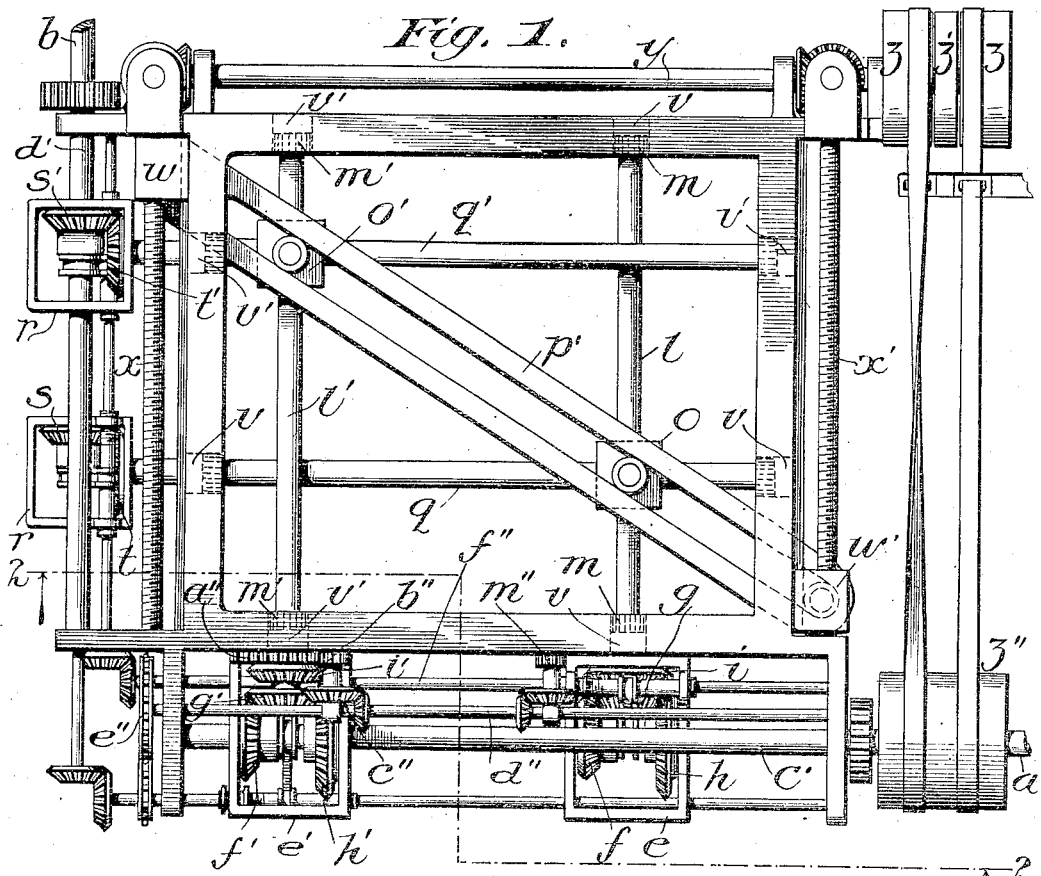
Figure 2:
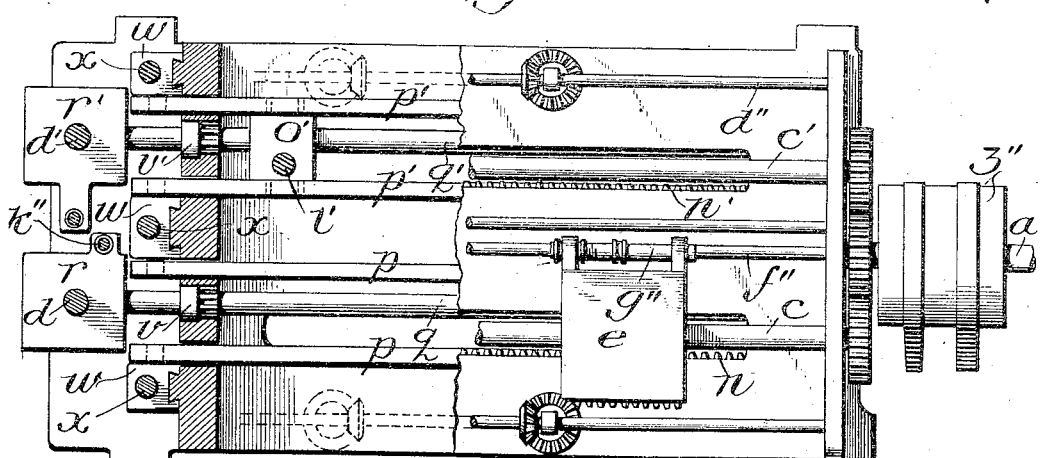

It is a principal object of my invention to attain these ends by the employment of positively acting mechanism for the transmission of power between said elements, excluding for said transmission, gearing of indefinite or variable speed value, such as frictional gearing, brakes, variable secondary prime movers, or hydraulic or electrical appliances. I attain these objects by the means shown in the accompanying drawings, in which Figure 1 is a plan view; Fig. 2 a front elevation broken away to show vertical section along the line 2—2 of Fig. 1, and omitting the pulleys at the lower right hand rear corner; Fig. 3 is a rear elevation; Fig. 4 is an end elevation looking from the left of Fig. 1; Figs. 5, 6, and 7, to be referred to hereafter, are views showing certain details on twice the scale of the other figures.

Similar letters refer to similar parts in all figures.

In the preferred form shown, the device comprises six principal parts as follows: a rotating driving element; a rotating driven element; two reciprocating power transmission mechanisms of equal speed value, each adapted to transmit power during a relatively slow driving stroke, which is followed by a quick, idle, return stroke, said driving stroke being longer in duration than said idle stroke, and said two reciprocating mechanisms being adapted to drive alternately, so that one or other or both shall at all times be engaged in transmitting power; means whereby the speed value of said power transmission mechanisms may be continuously varied at the pleasure of the operator; means adapted to cause the reciprocation of said power transmission mechanisms at the proper times.

I employ in the machine some of the elements and subcombinations of elements shown and claimed as new in my application for variable speed power transmission mechanism, filed April 29, 1905, S. No. 258,118.

Referring to the drawing, $a$ is the driving shaft, $b$ the driven shaft, $c$ and $c'$ two splined secondary driving shafts themselves driven simultaneously at equal rates from the driving shaft $a$ by three spur gears shown on the right in Fig. 2, and on the left in Fig. 3; $d$ and $d'$ are two splined secondary driven shafts, adapted to rotate the driven shaft $b$ by means of the three spur gears shown on the right of Fig. 3, and on the left of Fig. 4. Upon the splined shaft $c$ slides a box $e$ containing two engaging pairs of bevel gears $f$ $g$ and $h$ $i$ shown in Figs. 1 and 6. These gear systems are exactly similar in arrangement to the other two pairs of gears $f'$ $g'$ and $h'$ $i'$ shown more clearly in Fig. 1. By means of the clutches $j$ $k$ (Fig. 6) either the gear $f$ or the gear $h$ is adapted to be fixed to the shaft $c$, so that according as the one or the other of said clutches is operative, the shaft $l$, to which is fixed the gears $g$ and $i$, is rotated in one direction or its opposite. The ratio of the diameter of the gear $h$ to that of the gear $i$ is greater than the ratio of the diameter of the gear $f$ to that of the gear $g$, so that the motion of the shaft $l$ is more rapid when the clutch $k$ is operative than when the clutch $j$ is operative. Near the ends of the shaft $l$ are fixed two spur gears $m$ $m$ shown dotted in Figs. 1 and 3, engaging with racks $n$ shown in Figs. 2, and 3, and causing the shaft $l$ to travel longitudinally to the right or left according as it is being rotated by the gear $f$ or the gear $h$. The shaft $l$ has a bearing in a movable box $o$, shown in Figs. 1 and 7, which has rollers at top and bottom, as shown in Fig. 7, fitting in slots in the parallel adjustable guides $p$ $p$, so that the box $o$ is constrained by the longitudinal motion of the shaft $l$ and the guidance of the parts $p$ $p$ to travel in a more or less oblique direction depending on the direction of the guides $p$ $p$. Another shaft $q$ at right angles to the shaft $l$, and having also a bearing in the box $o$ is thus caused to move laterally across the frame of the machine by an amount depending on the direction of the guides $p$ $p$. Near the ends of the shaft $q$ are spur gears engaging with racks in the same manner as the spur gears $m$ $m$ already described and as illustrated in Figs. 1 and 2, so that the lateral motion of the shaft $q$ is necessarily attended with a motion of rotation also. Upon the splined shaft $d$ is a sliding box $r$ containing a pair of bevel gears, as shown in Figs. 1 and 5, of which the gear $t$ is fixed to the shaft $q$, while the gear $s$ is fixed to the shaft $d$, or not, according as the clutch mechanism $u$ (Fig. 5), similar to that within the gear $f$ shown in Fig. 6, is operative or not. As will be described hereafter, the gear $s$ is adapted to be clutched to the shaft $d$ while the gear $f$ is driving the shaft $l$, but the gear $s$ is loose on the shaft $d$ while the gear $h$ is driving the shaft $l$. Accordingly during more than half the time the driving element $a$ is adapted to rotate the driven element $b$ through the train of gearing just described, which includes the shaft $c$, the bevel gears, $f$, $g$, the pinions $m$ $m$, the racks $n$ $n$, the box $o$, the guides $p$ $p$, the shaft $q$ with its pinions and their racks, the gears $s$, $t$, and the shaft $d$. A similar train of gearing, $c'$, $f'$, $g'$, $m'$ $m'$, $n'$ $n'$, $o'$, $p'$ $p'$, $q'$, $s'$, $t'$, $d'$ is adapted to drive the element $b$ during more than half the time, and including the interval when the idle or return stroke of the first named transmission system of gearing is taking place, so that one or the other or both transmission systems of gearing is adapted at all times to drive the element $b$. Before passing on to describe other combinations, it should be mentioned that anti-friction rollers $v$ $v$ $v$ $v$, $v'$ $v'$ $v'$ $v'$ are provided, rolling between suitable guides adapted to maintain the shafts $l$, $q$, $l'$, $q'$, in positions for proper engagement of the pinions and racks $m$, $n$, $m'$, $n'$.

For the purpose of altering at pleasure the speed ratio between the driving element $a$ and the driven element $b$, means shown in Figs. 1, 2, and 3 are provided for altering the inclination of the guides $p$ $p$, $p'p'$. At the left hand end of the machine these said guides are pinned, as indicated in Fig. 2, to three blocks, $w$ $w$ $w$, which are adapted to be moved transversely on suitable guides as shown. At the right hand end of the machine the guides $p$ $p$, $p'$ $p'$, are held by rollers attached to three transversely movable blocks similar to $w$ $w$ $w$ of which the uppermost, $w'$, is shown in Fig. 1. The six blocks which fix the position of the guides $p$ $p$, $p'$ $p'$, are interiorly threaded to fit six screws $x$, $x$, $x$, $x'$ . . . ., which themselves are adapted to be rotated simultaneously by the bevel gear systems best shown in Fig. 3 adapted to be rotated in their turn by the shaft $y$. Upon this shaft $y$ are two loose pulleys $z$ $z$ and a fixed pulley $z'$, communicating by a straight belt and a crossed belt to a fixed pulley $z''$ on the driving shaft $a$, as shown in Figs. 1, 2, 3, and 4. By means of a belt shipper indicated in Fig. 1, it is arranged to move either the crossed or the straight belt to the fixed pulley $z'$, so as to rotate the shaft $y$ in either direction at pleasure, and thereby to cause the guides $p$ $p$, $p'$ $p'$, to assume any desired direction, and thereby to establish any desired speed of driving of the element $b$.

It remains to describe the means for causing the reciprocation of the two transmission systems of gearing. During their driving strokes the direction of motion of the shafts $l$ $l'$ may be considered to be from left towards right in Fig. 1. The shaft $l$ is shown near the end of its driving stroke, and its direction of motion should presently be reversed. To accomplish this, a rack, $a''$ on the box $e'$, is adapted to engage a pinion $b''$ free to rotate on a bearing fixed to the frame of the machine; and this pinion is fixed to a bevel gear $c''$, itself adapted to rotate a bevel gear on the shaft $d''$, thus turning the shaft $d''$, which carries a sprocket wheel $e''$ whose rotation causes the rotation of the splined shaft $f'''$ to which is splined a sleeve $g''$ in the box $e$. (See Fig. 6.) The sleeve $g''$ is threaded exteriorly at one end and fits within a splined nut $h''$, free to slide longitudinally in the box $e$, but urged toward the left by a stiff spiral spring $i''$. Accordingly as the sleeve $g''$ begins to rotate with the splined shaft $f'''$, the splined nut $h''$ at first slides toward the left until held by the stop collar shown in Fig. 6, and then a continuation of the rotation of the shaft $f'''$ moves the sleeve $g''$ toward the right carrying with it the clutch shipper $j''$, which loosens the gear $f$ and clutches the gear $h$ to the shaft $c$, as clearly shown in Fig. 6, and thus starting the shaft $l$ on its return stroke. But the shaft $f'''$ has at its left hand end (Fig. 1.) a bevel gear engaging with the bevel gear on the splined shaft $k''$ (Figs. 4, 5). This shaft $k''$ is splined to the sleeve $l''$ (Fig. 5.) which is provided with an exterior screw thread fitting into a thread cut in the box $r$. Consequently the rotation of the shaft $k''$ causes the sleeve $l''$ to be moved toward the right, (Fig. 5.) and while the nut $h''$ (Fig. 6.) above described is being shifted toward the left, the gear $s$ is being unclutched, so that before the shaft $l$ has ceased its driving stroke, it ceases to drive the shaft $d$. The length of the rack $a''$ just suffices to complete the movements above described, before the spur gear $b''$ is passed. At $m''$ the rack $a''$ engages a similar gear system adapted to drive the shafts $f'''$ and $k''$ in opposite directions to those above described and thus to loose the gear $h$, and clamp the gears $f$ and $s$, thus again starting the shaft $l$ on its driving stroke in a manner adapted to drive the shaft $d$. It will be noted that in this operation the gear $f$ is clutched to the shaft $c$ before the gear $s$ is clutched to the shaft $d$, and that the last turns of the sleeve $g''$ merely cause the sliding of the nut $h''$ against the spring $i''$. Thus the shaft $d$ is being driven by the shaft $l$ only during the times when the shaft $l$ is regularly moving on its driving stroke. At other times the shaft $d$ is caused to rotate by the gearing connecting it with the driven member $b$. An almost exactly similar reversing train of mechanism is shown in Figs. 1, 2, and 4, adapted to reverse the shaft $l'$, and clutch and loose the gear $s'$ at proper times in the same manner as above described.

The manner of operation of the machine may be summarized as follows: The driving element $a$ and the splined shafts $c\ c'$ being in continuous rotation, these latter through the gear systems within the boxes $e\ e'$, and the racks and pinions $m\ n\ m'\ n'$, cause the shafts $l\ l'$ to take up a motion of combined rotation and translation. By means of the guides $p\ p$, $p'\ p'$, the guided members $o\ o'$ and the racks and pinions coöperating with the shafts $q\ q'$, the motion of the shafts $l\ l'$ is communicated to the shafts $q\ q'$, and by these and the gear systems within the boxes $r\ r'$ the splined shafts $d\ d'$, are caused to rotate, and with them the driven element $b$. By means of screws $x\ x\ x, x'\ldots$ coöperating with shafts, pulleys, belts and bevel gearing as shown, the operator is enabled to communicate motion from the driving element in a manner adapted to alter the direction of the guides $p\ p$, $p'\ p'$, and thus to alter the rate of driving of the driven element. Finally two systems of gearing are provided, actuated intermittently in opposite directions by means of racks fixed to the boxes $e$ and $e'$, said systems of gearing being adapted respectively to reverse the motion of the shafts $l$ and $l'$, each at two points in their longitudinal motion, and thereby to cause these shafts, and the shafts $q\ q'$ to have reciprocating motions of combined rotation and translation. Also, the said two systems of gearing are adapted to cause the shafts $q\ q'$ to drive the shafts $d\ d'$ when the shafts $l\ l'$ are moving in a forward direction, and to loose the said shafts $d\ d'$ when the said shafts $l\ l'$ are moving in the opposite direction. Inasmuch as the time of forward stroke of the shafts $l\ l'$ exceeds the time of return stroke and reversal, the whole system is thus adapted to maintain constantly a definite ratio of speeds between the driving element and the driven element, and means are provided, as above described, for varying said speed ratio at pleasure.

What I claim as my invention and desire to secure by Letters Patent is:

1. The combination of a driving element, a driven element, and means for establishing, and maintaining constantly, exactly, and positively, a desired speed ratio between said elements, or for continuously varying said speed ratio.

2. The combination of a driving element, a driven element, a train of gearing for transmitting power between said elements, said train of gearing being adapted to maintain positively, continuously, invariably, and definitely a desired speed ratio between said elements, and means whereby said speed ratio may be continuously varied.

3. The combination of a driving element; a driven element; mechanism for transmitting power between said elements; said mechanism comprising a plurality of trains of gearing, said trains of gearing being each adapted to transmit power from said driving element to said driven element, and to maintain constantly during such transmittal a fixed, definite, invariable, ratio of speeds between said driving element and said driven element, said trains of gearing being correlated and combined together in a manner adapted to maintain continuously said fixed, definite invariable ratio of speeds between said driving element and said driven element; and means for continuously varying said ratio of speeds between said driving element and said driven element.

4. The combination of a driving element, a driven element, a plurality of trains of reciprocating gearing for transmitting power intermittently between said elements, said trains of gearing being combined and correlated in a manner adapted to establish and maintain invariably and continuously a desired speed ratio between said driving element and said driven element, and means for continuously varying said speed ratio.

5. The combination of a driving element, a driven element, a plurality of trains of reciprocating gearing of constant and definite speed value for transmitting power intermittently between said elements, and means whereby each of said trains of gearing, while transmitting power between said elements, is adapted alternately to disengage and reengage other of said trains of gearing in the transmission of power between said elements, to the end that said transmission of power may be absolutely continuous, and the ratio of speeds between said driving element and said driven element may be constant and definite.

6. The combination of a train of gearing of constant, definite and exact speed value, and means whereby said speed value may be established and maintained at a desired quantity or varied continuously.

7. The combination of a driving element, a driven element, a train of gearing of continuous, invariable and definite, speed value for transmitting power between said elements, and means whereby said speed value may be established and maintained at a desired quantity, or varied continuously, said means comprising an adjustable guide, elements for fixing the position of said guide, screws for moving said elements, mechanism for communicating motion from said driving element in a manner adapted to rotate said screws, and means whereby said screws may be fixed, or rotated in either direction by said driving element and said mechanism, as desired by the operator.

8. In a train of gearing of continuous, invariable, and definite speed value, the combination of two splined shafts adapted to receive uniform motions of rotation, two elements adapted to receive motions of translation thereon, two shafts adapted to receive combined motions of rotation and translation, and to communicate said motions of translation to said elements, means for communicating motion of rotation from said splined shafts to said shafts, two other shafts adapted to receive motions of combined rotation and translation, two boxes adapted to act as longitudinally displaceable bearings for said first named and said second named shafts, anti-friction rollers upon said boxes adapted to limit the position of said boxes, as constrained by guides, guides or constraining members adapted to constrain the direction of motion of said boxes, racks adapted to impart to said first named shafts motion of translation, racks adapted to impart to said second named shafts motions of rotation, two splined shafts, means whereby said motion of rotation of said second named shafts is communicated intermittently to said two second splined shafts, means whereby the direction, and rate of motion of said first named two shafts are altered alternately in a manner adapted to produce in each of said first named shafts a slow "driving stroke" and a quick "return stroke", said last mentioned means being adapted to cause that one or other or both of said first named shafts shall be engaged in its "driving stroke" and communicating motion to one or both of said last mentioned splined shafts at all times.

9. In a variable speed power transmission mechanism the combination of a plurality of elements having reciprocating motions, said reciprocating motions comprising "driving strokes" and "return strokes"; a plurality of other elements adapted to receive motions from said first named elements; means whereby the speeds of said second named elements may be fixed at a desired ratio to those of said first named elements; means for varying said ratio continuously; a driven element, and means whereby the motion received by said second named elements during the "driving strokes" of said first named elements may be transmitted in a manner adapted to maintain said driven element in continuous motion bearing a definite speed ratio to the motions of said first named elements during their "driving strokes."

10. The combination of a driving element; a driven element; two splined shafts adapted to be rotated by said driving element; two splined shafts adapted to rotate said driven element; two trains of gearing whereby each of said first named splined shafts is adapted to rotate intermittently one of said second named splined shafts, said trains of gearing comprising in each case: a box adapted to slide upon one of said first named splined shafts, four bevel gears within said box, two of said bevel gears adapted to be rotated alternately by said splined shaft, the other two of said gears engaging respectively with said two gears in a manner adapted to turn at unequal rates and in opposite directions a shaft to which they are fixed, a shaft rotated by said gears, two pinions fixed on said shaft, two fixed racks engaging said pinions and adapted to give to said shaft a motion of translation, two rollers on said shaft, guides adapted to coöperate with said rollers to keep said racks and said pinions in proper engagement, a displaceable box on said shaft, two rollers on said box, two second guides adapted to coöperate with said shaft and said rollers to give said displaceable box a translatory motion in a desired direction, a second shaft at right angles with said first named shaft and having a bearing in said box and adapted to receive motion of translation, two rollers on said second shaft, two pinions fixed on said second shaft, two fixed racks engaging said pinions and adapted to impart to said second shaft motion of rotation, a fifth bevel gear fixed to said second shaft, a sixth bevel gear engaging with said fifth bevel gear, and adapted to rotate one of said second named splined shafts intermittently; means for altering the direction of said second guides for the purpose of changing the ratio of speeds of said driving element and said driven element, said means comprising blocks adapted to retain the ends of said second guides in desired positions, guides on which said blocks are adapted to be moved, screws for moving said blocks on said last named guides, a common shaft, gearing for rotating said screws from said common shaft, means whereby said common shaft may be rotated in either direction as desired; means for reversing the motion of said first mentioned shaft, and for clutching and unclutching said sixth gear in each of said two trains of gearing, said means comprising in each case a rack fixed to said first named box, two pinions engaging successively with said rack, two bevel gears rotating with said pinions, two beveled gears engaging with said just named beveled gears, a shaft adapted to be rotated thereby in opposite directions, a fifth splined shaft and means for communicating said motion of rotation thereto, a sleeve splined to said fifth splined shaft, said sleeve having a bearing in said first named box, said sleeve being provided with a screw thread, a splined nut adapted to slide in a bearing in said box, and fitting said screw thread on said sleeve, a spring and collar on said nut, urging and limiting its sliding, respectively, means for alternately clutching two of said first named beveled gears to said first named splined shaft, a shipper arm on said sleeve, said shipper arm being adapted to loose one, and clutch the other of said just mentioned beveled gears, according to the direction of rotation of said fifth splined shaft, a sixth splined shaft adapted to be rotated by said fifth splined shaft, a second sleeve splined to said sixth splined shaft, and having a screw thread, a box containing said fifth and sixth bevel gears, and having an interior screw thread fitting said screw thread on said second sleeve, a clutch for fixing said sixth bevel gear to one of said two second mentioned splined shafts, a shipper arm on said second sleeve adapted to operate and loose said clutch; the whole machine being adapted to transmit power continuously and uniformly at a desired rate, and adapted to a continuous change of said rate, substantially as hereinbefore set forth.

In testimony whereof I affix my signature in presence of two witnesses.

CHARLES GREELEY ABBOT.

Witnesses:
J. LOUIS WILLIGE,
JOHN U. PERKINS.